United States Patent Office 3,047,525
Patented July 31, 1962

3,047,525
BAKING TYPE RESINS FROM BENZENE
TRICARBOXYLIC ACIDS
Ronald L. Broadhead, Park Forest, Ill., assignor to Standard Oil Company, Chicago, Ill., a corporation of Indiana
No Drawing. Filed Dec. 14, 1959, Ser. No. 859,121
15 Claims. (Cl. 260—32.8)

This invention relates to polyester resins characterized by thermosetting properties and particularly such resins containing an agent for lowering the thermosetting temperature.

Extremely good quality thermosetting resins made from benzene tricarboxylic acid, aliphatic dicarboxylic acid and aliphatic polyol are now available in both organic soluble and water soluble forms. These resins make the best articles and films when baked at temperatures on the order of 400° F. The bulk of present commercial users of baked film protective coatings are equipment limited to operation in the region of 300° F.–350° F. It is therefore the principal object of this invention to provide a resin composition of the above type which possesses thermosetting characteristics at baking temperatures well below 400° F. Other objects will become apparent in the course of the detailed description of the invention.

The composition of the invention takes two separate forms, namely, (1) a composition wherein the resin portion is soluble in oxygenated organic solvents and (2) a composition wherein the resinous portion is soluble in water, in combination with an agent which lowers significantly the thermosetting temperature of the resin or resinous material respectively. The resin consists of the polyester condensation reaction product of benzene tricarboxylic acid or anhydride and of aliphatic dicarboxylic acid containing at least 4 carbon atoms and aliphatic polyol. The water soluble resinous products consists of the polyester condensation reaction product resin reacted with an alkaline substance to obtain water solubility. The agent utilized in the composition of the invention is an aliphatic dialdehyde containing from 6 to about 15 carbon atoms. In the case of the water soluble composition, it is preferred that the defined dialdehyde be water soluble.

The hereinafter defined resin, and water soluble resinous product, component of the composition of the invention is characterized by the ability to form a thermoset solid upon air-baking at a temperature on the order of 400° F. The presence of the hereinafter defined agent in the resin, or resinous product, enables the production of essentially the same quality thermoset solids (in some instances, better) upon air-baking at temperatures in the region of 300° F. to 325° F. The agent utilized in the composition is an aliphatic dialdehyde containing from 6 to about 15 carbon atoms. The dialdehyde may contain only carbon and hydrogen atoms in addition to the aldehyde groups. Or other substituents may be present, such as, hydroxy group(s), sulfonyl group(s), carboxyl group(s), and halogen(s). Illustrative dialdehydes are adipaldehyde and α-hydroxyadipaldehyde. When utilizing the hereinafter defined resin or hereinafter defined resinous product, the agent may be dispersed throughout the resin or resinous product or dissolved therein. When the resin is dissolved in an oxygenated organic solvent for purposes of preparing films on surfaces, the agent may be dispersed throughout the solution or an agent utilized which is soluble in the particular solvent.

Sufficient agent is present to lower significantly the thermosetting temperature of the resin or resinous product or to attain the desired degree of temperature lowering into the region of 300° F. to 325° F. When operating to form baked films from solutions of resin in oxygenated organic solvent or water solution of resinous product, in general the agent is present in said solution in amounts between about 0.5 and 10 weight percent based on resin or resinous product; more commonly, from about 2 to 6 weight percent. It is to be understood that more or less than this particular amount of agent may be used, in part depending upon the particular agent utilized and the particular resin.

RESIN

The resin polyester condensation reaction product is prepared by condensing an aliphatic polyol, an aliphatic dicarboxylic acid containing at least 4 carbon atoms, and a benzene tricarboxylic acid at elevated temperatures, for example, about 300°–400° F., while continuously removing the water formed in the reaction. The polyester condensation reaction is well known and it is not necessary to describe it in detail herein. The benzene tricarboxylic acids and anhydrides may also be described as acidic members selected from the class consisting of benzene tricarboxylic acids containing, as the only substituents, 3 carboxyl groups, and anhydrides thereof. The individual members of the defined class are trimellitic acid, trimellitic anhydride, trimesic acid, hemimellitic acid and hemimellitic anhydride. Trimellitic anhydride is the preferred acidic member.

The reaction requires the presence of an aliphatic polyol containing two or more hydroxy groups. Any of the well-known aliphatic polyols may be used such as alkylene glycols, (including the ether glycols) glycerol, tetrahydroxy alcohols, and hexahydroxy alcohols. Examples of suitable aliphatic polyols are ethylene glycol, propylene glycol, hexamethylene glycol, diethylene glycol, triethylene glycol, glycerol, trimethylolpropane, erythritol, pentaerythritol, dipentaerythritol, mannitol, and sorbitol. The alkylene glycols, and especially the lower glycols (containing 12 or less carbon atoms) are preferred polyols.

The reaction requires the presence of an aliphatic dicarboxylic acid containing at least 4 carbon atoms. Examples of suitable acids are succinic, glutaric, adipic, suberic, sebacic, maleic, itaconic, 1,6-hexene-3-dioic, linoleic-dimer, hexadecanedioic, eicosanedioic, hexacosanodioic and tetratriacontanedioic. The alkandioic acids containing from 4 to about 20 carbon atoms are preferred.

In addition to the defined benzene tribasic acids, the defined aliphatic dicarboxylic acids and the define aliphatic polyols, the resin polyester condensation reaction product may include an aliphatic monohydroxy alcohol. The aliphatic monohydroxy alcohols include, by way of example, methyl alcohol, butyl alcohol, hexyl alcohol, stearyl alcohol, allyl alcohol, and oleyl alcohol. In addition to the individual compound, mixtures of these monohydroxy alcohols may be used, e.g., the mixtures obtained from the oxoation of a mixture of olefins. Such mixtures of Oxo alcohols are now available commercially and are known as isooctyl alcohol, nonyl alcohol, isodecyl alcohol, and tridecyl alcohol.

The resin polyester condensation reaction product may be obtained by using individual benzene acids or anhydrides, individual aliphatic dicarboxylic acids or individual polyols, (and individual monohydroxy alcohols) or a mixture of benzene acids, or acids or polyols (or monohydroxy alcohols).

The characteristics of the resin polyester condensation reaction product is dependent upon the type of reactants, and upon the mole ratios existing among the reactants. In general, the mole ratio of the defined benzene acid to the defined dicarboxylic acid to defined polyol is from about 1:1:2 to 10:1:25. Ratios of reactants outside the spelled out range may be utilized for production of resins having special properties. More usually, the mole ratio of defined benzene acid to defined dicarboxylic acid is between about 2 and 5. When a glycol is used as the polyol, the preferred charge to the polyester condensation zone is calculated on the basis of about 2 moles of glycol per mole of defined benzene acid and about 1 mole of alcohol per mole of defined dicarboxylic acid. At the same ratio of reactants, the surface coatings obtainable from the resins may not be of essentially identical characteristics for different reaction systems.

When a monohydroxy alcohol is also present, it is desirable to have a mole ratio of defined polyol to monohydroxy alcohol between 1 and 10. It is to be understood that the amount of monohydroxy alcohol may be less than this amount or more than this amount, dependent upon the desired characteristics of the final product.

The polyester condensation reaction product desirably is prepared under conditions of reaction such that the resin has an acid number the lowest possible commensurate with avoiding gelation. In general, the acid number of the polyester product will be between about 20 and 100. (It is to be understood that not all combinations of the defined reactants can produce an acid number as low as 20, however.) The resin polyester products are soluble in oxygenated solvents such as alcohols and ketones and mixtures of these with benzene hydrocarbons.

The resin polyester condensation reaction products range from very viscous liquids to hard solids in appearance. These polyester products possess the common characteristic of forming "rigid" solids when baked at temperatures on the order of 400° F. in the presence of oxygen or air. The degree of baking (curing) needed to obtain a thermoset material will depend upon the particular polyester product. In general, the products made from the trimellitic anhydride, alkandioic acids, and lower glycols form thermoset materials at 400° F. in times ranging from 15 minutes to 1 hour. These polyester resins will cure to thermoset materials at lower temperatures, but require much longer times. An outstanding characteristic of the thermoset solids derived from the polyester products of the invention is the excellent color present in the thermoset solid. Unlike the majority of the presently available commercial materials which form rigid thermoset solids, the color of the polyester product is not significantly degraded by this severe curing at about 400° F. Another outstanding characteristic of the thermoset solids is the glossy surface appearance.

The composition of the invention consists essentially of the hereinabove defined resin polyester condensation reaction product and an amount of a defined aliphatic dialdehyde agent sufficient to lower significantly the thermosetting temperature of the above defined resin. Usually the composition contains agent in an amount between about 0.5 and 10 weight percent based on said resin. The catalyst may be dispersed or dissolved directly into the resin or it may be dispersed or dissolved in an oxygenated organic solvent solution of the resin. When the solvent evaporates the catalyst remains with the resin film and performs its thermosetting temperature reducing function.

The compositions of the invention have utility in the broad field of rigid plastics now occupied by materials such as phenol formaldehyde resins and filled melamine-formaldehyde resins. They may also be used as binders for laminations such as plywood forming and fiber glass reinforced plastics. In both of these uses, the compositions of the invention are particularly good because no additional curing agent need be added in order to obtain good rigidity or suitably short curing times.

The compositions in themselves are excellent film-formers when dissolved in oxygenated organic solvents for use in the formation of baked surface coatings. The compositions of solvent solution may have pigments introduced therein, in order to produce enamel finishes which possess high gloss.

The resin products are soluble in the oxygenated organic solvents commonly used in the surface coating field. The better known of these solvents are alcohols such as methyl and butyl, and ketones such as acetone and methylethylketone. Also, these materials may be dissolved in the commonly used mixtures of benzene hydrocarbons such as toluene and xylene with an oxygenated organic solvent; a typical mixed solvent consists of a 60:40 volume ratio of mixed xylenes and butanol.

The polyester condensation reaction is carried out in normal fashion. However, the nature of some of the reactants makes it preferably to modify the start-up procedure. It is preferred to have in the reaction zone at least 1 liquid reactant; the liquid reactant may be naturally liquid or liquid at the temperature of the polyester condensation reaction. In the case of a normally liquid reactant, all the reactants are charged into the reaction zone and all reactants brought to the reaction temperature simultaneously. Where all the reactants are normally solid, it is preferred to add the lowest melting reactant to the reaction zone first and produce a liquid material by raising the temperature to the melting point; then the other reactants are introduced and the whole brought to the desired reaction temperature. Also, the reactants may be added in order of melting point in sequence in order to have the material in the reaction zone substantially liquid at all times. It is to be understood that, regardless of the method of addition of the reactants, all of the reactants are, for practical purposes, simultaneously present throughout the reaction (cooking) time.

RESINOUS PRODUCT

The water soluble resin consists essentially of the resin produced by the reaction of the polyester condensation reaction product and an alkaline reacting material. The resin product and the alkaline material are reacted until a water soluble resinous product is obtained. The amount of alkaline reacting material is most readily determined by following the pH of the reaction medium. An aqueous reaction medium is preferred when the water soluble resinous product is to be used for surface coating applications because the desired water solution is obtained immediately. When the resin product and aqueous reaction medium are contacted in the presence of an alkaline reacting material, the resinous product passes into solution substantially completely at a pH of about 5. In practically all instances, the resinous product will be in complete solution at a pH of about 6. The use of alkaline reacting material in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amine aliphatic alcohols, such as ethanolamines, are suitable. The heteroamines, such as morpholine, pyridine, and piperidine may be used. The type of alkaline reacting material used is determined in part by the characteristics desired in the final water soluble resin; also, by the type of resin product which is to be converted to a water soluble form. Preferred materials are aqueous ammonia, and the lower molecular weight amines, such as ethylamines and butylamines and morpholine.

The neutralization reaction is carried out by contacting the resin product and the alkaline reacting medium, when necessary in the presence of a liquid reacting medium; particularly suitable reaction mediums are oxygenated organic solvents and water. When water is used as the liquid reaction medium, it is preferred that it be warm, i.e., maintained in the region of 100–160° F.; the resin product is added to the aqueous alkaline reaction material and the two agitated until the resinous product has passed into solution. Ammonium hydroxide solution is a particularly suitable aqueous alkaline medium. The water solutions of the water soluble resinous products are clear liquids usually containing some opalescent appearance; the solutions may be colorless or colored, depending on the particular water soluble resin present.

The water soluble resinous product behaves in essentially the same manner as the resin product when exposed to oxygen or air at elevated temperatures in that an air-baked or cured thermoset solid is formed. At temperatures on the order of 400° F., the water soluble resin produces hard films on metal surfaces in times of 15 minutes to 1 hour. An outstanding characteristic of the products is that the water soluble resins possess essentially the identical thermosetting properties that the water insoluble polyester resin product progenitors possess. Surprisingly, the films produced from the water solutions possess the same very high gloss that the films produced from the solvent solutions of polyester products possess; this gloss is particularly apparent in the presence of pigments where enamel finishes are obtained.

In addition to their high solubility, which may be as much or more than 50 percent by weight, the water soluble resins are also soluble in the ordinary oxygenated organic solvents as well as in mixtures of these with benzene hydrocarbons. Because of its cheapness and safety, water is the preferred solution for surface coating applications and also as an aqueous reaction medium.

The water soluble composition of the invention consists essentially of the above defined water soluble resinous reaction product and an amount of the defined dialdehyde agent sufficient to lower significantly the thermosetting temperature of the resinous product. Usually the agent is present in an amount of about 0.5 to 10 weight percent based on the resinous product; the agent may be introduced directly into the resinous material itself or may be dissolved into a water or aqueous solution of the resinous material. When the water or aqueous solution is evaporated, the catalyst remains with the film of resinous material and performs its thermosetting temperature reducing function.

The water soluble composition may be recovered from the reaction medium and used for the preparation of thermoset solids in the same applications as the resin composition may be used. For surface coating purposes, the solid water soluble composition is preferably dissolved in a sufficient amount of water to produce the desired viscosity for the particular application.

The benefits of the hereinabove defined agent in the defined resinous material are illustrated by the following which do not limit the scope of the invention.

Example I

A resin was prepared from trimellitic anhydride, adipic acid, and neopentyl glycol in a mole ratio of 3:1:7. The reactants were raised to 352° F. and cooked for a period of 7 hours with a sparge of nitrogen gas; water of reaction was condensed and removed. The polyester resin product was a clear, yellowish solid with an acid number (mg. KOH/g.) of 52. The solid resin was dissolved in a 60:40 (by volume) mixture of xylene and butanol to obtain a 50% solution, i.e., 1 part by weight of resin for 1 part by weight of solvent.

This resin was converted to the water soluble form by treatment with ammonium hydroxide and subsequent dilution with distilled water to obtain a water solution of pH 6 containing 30 weight percent of resinous material.

Twenty grams of this 30 percent resinous material solution and 1.1 grams of a water solution of α-hydroxyadipaldehyde containing 25 percent of the aldehyde were intermingled. (The final aqueous solution contained 4.6% of the aldehyde based on resinous material present.) A tin plated steel panel was coated with the aqueous solution and baked at 300° F. for 30 minutes to produce a film of 1 mil. thickness. The baked film was a brown color with a very glossy finish. The film was hard and adhered firmly to the panel.

At this temperature of baking the resinous solution containing no agent was inferior in quality to the film produced from the agent containing composition.

A panel was prepared from a solution containing 85 weight percent of the aldehyde based on resinous material. Hard but very brittle films were produced on baking for only 5 minutes at 275° F.

Example II

A resin was prepared from the following reactants: trimellitic anhydride, 3 moles; adipic acid, 1 mole; ethylene glycol, 4.8 moles; and isooctyl alcohol (Oxo), 0.8 mole. The glycol was heated in a flask to 130° C. Both the anhydride and the acid were added to the flask over a 10 minute period. Thirty minutes after the acids were completely added the isooctyl alcohol was added. At this time the temperature in the flask was 161° C. The contents of the flask were cooked for about 4 hours at 161–171° C. Cooking was stopped when the charge showed some signs of gelling. The resin product at room temperature was a clear pale yellow, slightly brittle solid. The acid number of the resin was 177.

A clear off-white water solution was prepared by stirring 10 grams of the above resin with 3.8 grams of tris hydroxymethylaminomethane and 40 ml. of distilled water. Four grams of 25% aqueous α-hydroxyadipaldehyde were added to this aqueous solution. A tin-plated panel was coated with the agent containing solution and baked at 300° F. After 25 minutes at this temperature the film had thermoset to produce a hard glossy firmly adhering coating which was somewhat brittle. The coating was a dark yellow in color.

A film produced on a panel under these same conditions from a solution containing no catalyst was inferior in properties to the film from the agent containing solution.

Thus having described the invention what is claimed is:

1. A composition consisting essentially of (A) the resin polyester condensation reaction product of (1) a benzene tricarboxylic acidic member selected from the class consisting of trimellitic acid, trimellitic anhydride, trimesic acid, hemimellitic acid and hemimellitic anhydride, (2) an alkandioic acid containing from 4 to about 20 carbon atoms, and (3) a glycol containing not more than 12 carbon atoms, wherein the mole ratio of tricarboxylic acidic member:alkandioic acid:glycol is between about 1:1:2 to 10:1:25, said reaction being continued until the product has an acid number between about 20 and about 100, which resin is characterized by the formation of a thermoset solid upon air-baking at a temperature on the order of 400° F., and (B) about 0.5–10 weight percent, based on said resin A, of an agent which lowers the thermosetting temperature of said resin A, which agent is a dialdehyde selected from the class consisting of adipaldehyde and hydroxyadipaldehyde.

2. The composition of claim 1 wherein said agent is α-hydroxyadipaldehyde.

3. The composition of claim 1 wherein said agent is present in an amount between about 2 and 6 weight percent based on said resin.

4. The composition of claim 1 wherein said acidic member is trimellitic anhydride.

5. The composition of claim 1 wherein said acid is adipic acid.

6. The composition of claim 1 wherein said glycol is propylene glycol.

7. A liquid composition consisting essentially of the composition of claim 1 and a solvent therefor selected from the class consisting of oxygenated organic solvents and mixtures thereof with benzene hydrocarbons.

8. A water-soluble composition consisting essentially of (A) the water-soluble resinous reaction product of (I) an alkaline substance with (II) the polyester condensation reaction product of (1) a benzene tricarboxylic acidic member selected from the class consisting of trimellitic acid, trimellitic anhydride, trimesic acid, hemimellitic acid and hemimellitic anhydride, (2) an alkandioic acid containing from 4 to about 20 carbon atoms, and (3) a glycol containing not more than 12 carbon atoms wherein the mole ratio of tricarboxylic acidic member:alkandioic acid:glycol is between about 1:1:2 to 10:1:25, said reaction being continued until the product has an acid number between about 20 and about 100, which polyester is characteried by the formation of a thermoset solid upon airbaking at a temperature on the order of 400° F., said water-soluble reaction product being characterized by a water-solution pH of between about 5 and 8 and (B) about 0.5–10 weight percent, based on said resin A, of an agent which lowers the thermosetting temperature of said resin A, which agent is a dialdehyde selected from the class consisting of adipaldehyde and hydroxyadipaldehyde.

9. The water-soluble composition of claim 8 wherein said acidic member is trimellitic anhydride.

10. The water-soluble composition of claim 8 wherein said acid is adipic acid.

11. The water-soluble composition of claim 8 wherein said polyol is propylene glycol.

12. A liquid composition consisting essentially of the water-soluble composition of claim 8 and sufficient amount of water to dissolve said composition.

13. The water-soluble composition of claim 8 wherein said agent is $\alpha$-hydroxyadipaldehyde.

14. The water-soluble composition of claim 8 wherein said agent is present in an amount between about 2 and 6 weight percent based on said resinous product.

15. The water-soluble composition of claim 8 wherein said alkaline substance is selected from the class consisting of ammonia, lower alkyl amine and alkanolamine.

References Cited in the file of this patent

UNITED STATES PATENTS

| | | |
|---|---|---|
| 2,561,814 | Novotny et al. | July 24, 1951 |
| 2,562,878 | Blair | Aug. 7, 1951 |